United States Patent
Benja-Athon

(10) Patent No.: US 6,266,047 B1
(45) Date of Patent: Jul. 24, 2001

(54) THUMB-LITTLE-FINGER CONTROLLED COMPUTER MOUSE

(76) Inventor: Anuthep Benja-Athon, 210 E. 36th St., Ground Floor, New York, NY (US) 10016

( * ) Notice: Subject to any disclaimer, the term of this patent is extended or adjusted under 35 U.S.C. 154(b) by 0 days.

(21) Appl. No.: 09/243,731

(22) Filed: Feb. 1, 1999

(51) Int. Cl.[7] .................................................. G09G 5/08
(52) U.S. Cl. .......................... 345/163; 345/167; 345/157
(58) Field of Search ................................... 345/163, 167, 345/157

(56) References Cited

U.S. PATENT DOCUMENTS

| | | | |
|---|---|---|---|
| 5,260,696 | * 11/1993 | Maynard, Jr. ....................... | 345/163 |
| 5,414,445 | * 5/1995 | Kaneko et al. ..................... | 345/163 |
| 5,581,277 | * 12/1996 | Tajiri ................................. | 345/163 |
| 5,812,115 | * 9/1998 | Fan et al. .......................... | 345/163 |
| 5,825,350 | * 10/1998 | Case, Jr. et al. ................... | 345/163 |
| 5,949,406 | * 9/1999 | Kress ................................ | 345/163 |
| 5,990,866 | * 11/1999 | Yollin ............................... | 345/157 |
| 5,990,870 | * 11/1999 | Chen et al. ........................ | 345/163 |
| 6,091,403 | * 7/2000 | Bland ................................ | 345/163 |
| 6,181,322 | * 1/2001 | Nanavati ........................... | 345/163 |

* cited by examiner

Primary Examiner—Richard Hjerpe
Assistant Examiner—Benjamin D. Bowers

(57) ABSTRACT

A computer mouse which eliminates the function and involvement of the forefinger, middle finger and ring finger comprises a shell whose inclined back top surface is so contoured to position the palm of the computer and mouse operator at 30 degree extension to the horizontal surface, and the inclined front surface minimizes and, better yet, eliminates the movement of muscles and tendons of the forefinger, middle finger and ring finger. The mouse, and therefore, the computers are operated by the muscles of the thenar and hypothenar eminences whereby a left click button and a right click button are operated by the muscles of the thenar and hypothenar eminences, respectively. Alternatively, by reversibly locking the click buttons to a reversible nonmovable position, two broad skin surface myoelectrical electrode pads of the mouse on which the thenar and hypothenar eminences contourly fit and rest detect and transmit myoelectrical potential change and current signal cause by the activities of the muscles of the thenar and hypothenar eminences to the computer devices as a part of the control and interaction between the operator, mouse and computer devices. Two vertical, longitudinal, interdigital ridge members on the surface of top shell of the mouse are grasped and held by the fore, middle and ring fingers to move, hold, lift, manipulate and stabilize the mouse. The mouse prevents pain and dysfunction syndrome, inflammations and repetitive strain injuries of the upper extremity.

10 Claims, 2 Drawing Sheets

THUMB-LITTLE-FINGER CONTROLLED COMPUTER MOUSE

FIELD OF INVENTION

A computer mouse operate by the thumb and little finger to prevent pain, inflammations and repetitive strain injury of the upper extremity.

OBJECTIVES OF THE INVENTION

The present invention prevents and eliminates pain, inflammation and repetitive strain injury and cumulative traumatic disorders of the upper extremity of a person using a computer mouse.

Specifically, the present invention prevents and eliminates the stress and strain of the bodily structures passing through the carpal tunnel of the wrist of a person using a computer mouse.

Specifically, the present invention uses the muscles of the thenar and hypothenar eminences which move and control the thumb and fifth digit, respectively, and are independent, i.e. outside, of said ipsilateral carpal tunnel to prevent and eliminate pain, inflammation and repetitive strain injury and cumulative traumatic disorders of the upper extremity of a person using a computer mouse.

BACKGROUND OF THE INVENTION

Computer mouses of prior art use mostly the forefinger and lesser extent the middle finger and ring finger to click the left and right buttons of said mouse. The tendomuscular structures and their sheath including nerves and blood vessels pass through the narrow carpal tunnel. Ipsilateral thumb and little finger of the computer and mouse operator are not used for the above function and application of said mouse.

Cumulative traumatic disorders and repetitive strain injury of the upper extremity including fingers, wrist and forearm are commonly associate with said computer mouses of prior art. For example, in carpal tunnel syndrome, the current thinking is that the repetitive stroking of the click buttons by the said fingers eventually and causally results in the cumulative traumatic disorders of the flexor tendons, tendon sheaths and associated structures in the carpal tunnel, and consequently, compressive injury to the adjacent median nerve in same carpal tunnel. Debilitating inflammations, pain and dysfunction syndrome ensue costing Americans billions of dollars per annum of loss wages, earning and productivity, not to mention the intangible cost of suffering. As computer and laptop configuration become more commonly used the aforementioned problems will surely increase.

The computer mice of prior art including the so-called ergonomic mice are widely used and sold in the market and all suffer from the same set back as discussed supra.

The present invention eliminates and prevents said injuries and disorders by using the thumb and the little finger of one hand of the computer and mouse operator to interact with and operate and activate said mouse in the process of using and operating computer and laptop computer configuration.

SUMMARY OF THE INVENTION

The computer mice of prior art including the so-called ergonomic mice are widely used and sold in the market and all are associated with debilitating inflammations, pain and dysfunction syndrome such as carpal tunnel syndrome, repetitive strain injury and cumulative traumatic disorders of the upper extremity of the operator.

A computer mouse which eliminates the function and involvement of the forefinger, middle finger and ring finger comprises a shell whose inclined back top surface is so contoured to position the palm of the computer and mouse operator at 30 degree extension to the horizontal surface, and the inclined front surface minimizes and, better yet, eliminates the movement of muscles and tendons of the forefinger, middle finger and ring finger. The mouse, and therefore, the computers are operated by the muscles of the thenar and hypothenar eminences whereby a left click button and a right click button are operated by the muscles of the thenar and hypothenar eminences, respectively. Alternatively, by reversibly locking the click buttons to a reversible nonmovable position, two broad skin surface myoelectrical electrode pads of the mouse on which the thenar and hypothenar eminences contourly fit and rest detect and transmit myoelectrical potential change and current signal cause by the activities of the muscles of the thenar and hypothenar eminences to the computer devices as a part of the control and interaction between the operator, mouse and computer devices. Two vertical, longitudinal, interdigital ridge members on the surface of top shell of the mouse are grasped and held by the fore, middle and ring fingers to move, hold, lift, manipulate and stabilize the mouse. The mouse prevents pain and dysfunction syndrome, inflammations and repetitive strain injuries of the upper extremity.

DESCRIPTION OF THE PREFERRED EMBODIMENTS

All discussion and referred structures in this patent application is confined to one hand of the mouse and computer operator.

Figure 1:
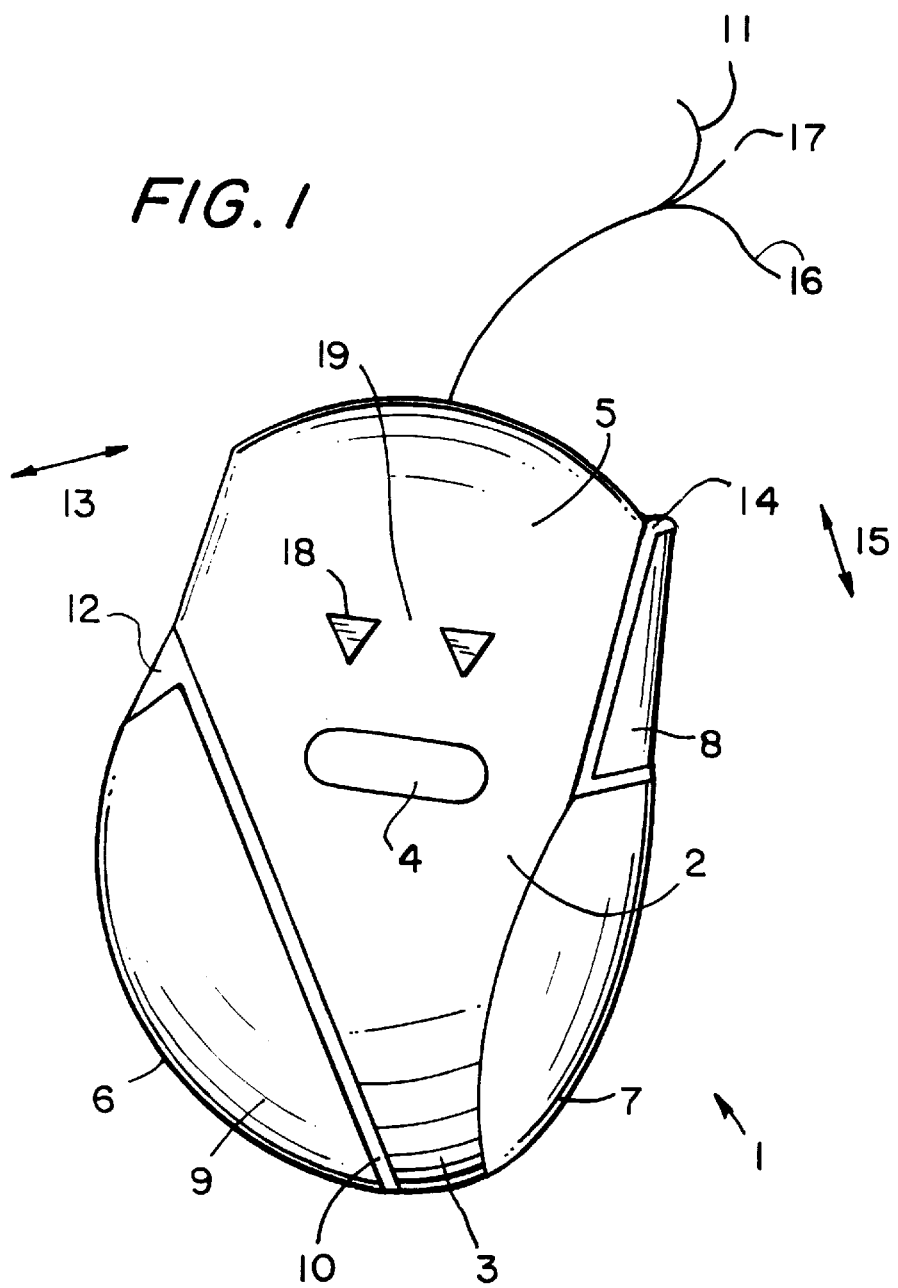
FIG. 1 is a schematic top view of the present invention.

FIG. 1 shows the hand-controlled and hand-held computer and laptop computer configuration controlling device which is the medium being widely used by a human computer and mouse operator for the interaction between said operator, said mouse which is connected by an electrical cord to said computer devices commonly known as the computer mouse 1 of the present invention. To prevent pain, inflammations and repetitive strain injuries of the hand structures including nerves and tendons and resultant pain and dysfunction syndrome of the upper extremity of said operator is to eliminate the use and function of the inciting structures by the ergonomic features of mouse 1 as discussed herein.

An ergonomic design to the top shell or case 2 of mouse 1 is to keep the carpal tunnel to be at the largest dimension base on available scientific data, to eliminate the function of 2nd, 3rd and 4th digits, also known as the forefinger, middle finger and ring finger, respectively and to use mainly the thenar and hypothenar muscles of the same hand of said operator. Therefore, mouse 1 comprises 1) means of positioning the wrist at optimal 30 degree extension relative to the horizontal surface of the desktop which is the bulbous, inclined posterior palmar part 3 of top shell of mouse 1 on which the palm of the hand of the operator so contoured to fit and to rest on the surface of said part at the inclination of said part (see FIG. 2) results in the palm of the operator to be at 30 degree to the horizontal surface of the mouse cushion pad or the horizontal surface of the desktop (see FIG. 2), 2) means of minimizing and, better yet, eliminating the involvement of the function of 2nd, 3rd and 4th digits which pass through the carpal tunnel of the wrist by maximally shortening the intrinsic and long flexor muscles of the 2nd, 3rd and 4th digits of the hand is the metacarpal part 4 being the apex of the intersection of the plane of the digital front part 5 of the top shell and the plane of the posterior palmar part 3 of top shell of said mouse whereby said planes intersect at about 90 degree angle at metacarpal part 4. So rest on part 5 and metacarpal part 4, the 2nd, 3rd and 4th digits are essentially immobilized and the intrinsic and long flexor muscles of the 2nd, 3rd and 4th digits are maximally shortened to render them nonfunctional and with least isometric movement.

The thumb and the fifth digit, also known as little finger, of the hand of said operator are recruited to use and operate mouse 1. For right-handed operator, FIG. 1 further shows mouse 1 comprises a left thenar click button 6, right hypothenar myoelectrical potential change and current detecting pad 7 and right fifth-digital click button 8. The ergonomic features of mouse 1 is as follow: 1) the utilization of the muscular power of the thenar and hypothenar of the hand base on the anatomical function of the muscles of the thenar and hypothenar eminences, 2) in addition, the utilization of the myoelectrical potential changes and current generated by the muscular activity of the muscles of said thenar and hypothenar eminences with various types of muscular contractions such as, but not limited to isotonic contraction or isometric contraction of said muscles.

First, left thenar click button 6 is a spring-loaded click button like that in other computer mouses. However, left thenar click button 6 is reversibly moved and operated by the thumb as the result of the activation and deactivation of the muscles, most predominantly the adductor muscles, of the left thenar eminence, theretofore, activate click button 6 when said muscles activate in adduction and release button 6 when said muscles deactivate in abduction, i.e. toward and away, respectively, from shell 2 as represent by single straight double arrow 13. Left thenar click button 6 is separated by a space or channel 10 which widens or narrows as click button 6 is being clicked.

Second, in another setting, spring-loaded click button can be deactivated by standard deactivation lock mechanism build into mouse 1 to immobilize or freeze pad 9 in a reversible fixed position so that the spring cannot be felt and activated with pressure from the thumb. In this setting, thenar myoelectrical potential change and current detecting pad 9 whose surface is in contact with the skin of the thenar eminence of said operator and senses, detects and transmits myoelectrical potential change and current from the isotonic or isometric activities of the muscles of the thenar eminence. With isometric contraction of the muscles of the thenar and production of said myoelectricity, the thumb of the operator does not move. From pad 9 is the electrical cable (not shown in the figure) which conducts said myoelectrical signal to cord 17 to the filter, amplifier and computer.

Left thenar click button 6 comprises a thenar myoelectrical potential change and current detecting pad 9 whose surface which is in contact with the skin of the thenar eminence and senses, detects and transmits myoelectrical potential change and current from the isotonic or isometric activities of the muscles of the thenar eminence. Of course, button 6 is contoured so that the bulk of the thenar eminence will comfortably fit into button 6 such as, but not limited to, a slight concavity of button 6 is made to fit the thenar eminence but yet allow the optimal contact between the skin over the thenar eminence and the surface of pad 9. The electrical conducting surface of pad 9 is manufactured with materials, such as, but not limited to, for making standard skin surface electrical currentconducting electrode and pad for studying myoelectrical potential changes and current commonly used with transcutaneous stimulator and myo-electrodiagnosis. The perspiration from the skin over the thenar eminence also serve as enhancement of electrical signal conduction. Moreover, electricity-conducting gel can also be used. From pad 9 is the electrical cable (not shown in the figure) which conducts said myoelectrical signal to cord 11 to the filter, amplifier and computer. Left thenar click button 6 also comprises a distal phalangeal pad 12 on which the mid and distal phalanges of the thumb rest and the flexor muscles of the thumb are immobilized.

Right hypothenar myoelectrical potential change and current detecting pad 7 is an extension of shell 2 and is not movable. However, similar thenar myoelectrical potential change and current detecting pad 9, pad 7 has the surface which is in contact with the skin of the hypothenar eminence and senses, detects and transmits myoelectrical potential change and current from the isotonic or isometric activities of the muscles of the hypothenar eminence. Of course, pad 7 is contoured so that the bulk of the hypothenar eminence will comfortably fit into pad 7 such as, but not limited to, a slight concavity of pad 7 is made to fit the hypothenar eminence but yet allow the optimal contact between the skin over the hypothenar eminence and the surface of pad 7. Like pad 9, the electrical conducting surface of pad 7 is manufactured with materials, such as, but not limited to, for making standard skin surface electrical current-conducting electrode and pad for studying myoelectrical potential changes and current commonly used with transcutaneous stimulator and myo-electrodiagnosis. They are made from metals, alloys, various rubber composites, gel-like substances and any combination thereof which have the physical property of conducting small myoelectrical current. The perspiration from the skin over the hypothenar eminence also serve as enhancement of electrical signal conduction. Moreover, additional add-on electricity-conducting gel can also be used. From pad 7 is the electrical cable (not shown in the figure) which conducts said myoelectrical signal to cord 16 to the filter, amplifier and computer.

Right fifth-digital spring-loaded click button 8 immobilizes the flexors of the fifth digit of the hand by design during manufacturing by physical setting button 8 relative to shell 2 and pad 7. By such setting as click button 8 is being clicked by the muscles, most predominantly the adductor muscles, of the hypothenar eminence said flexors are not involved. The motion of button 8, therefore, is in and out of the paper and toward the longitudinal midline of shell 2 as represents by double arrow 15. Similar to space or channel 12, space or channel 14 widens or narrows as button 8 is being clicked. Signal generated by click button 8 is transmitted via electrical cable 16 to said computer devices.

Like button 6, spring-loaded click button 8 can be deactivated by standard deactivation reversible lock mechanism built into mouse 1 to immobilize or freeze pad 9 in a reversible fixed position so that the spring cannot be felt and activated with pressure from the fifth digit. In this setting, hypothenar myoelectrical potential change and current detecting pad 7 is called into action as discussed supra.

During the manufacturing process, two vertical, longitudinal, interdigital ridge members 18 of digital front part 5 of top shell 2 can be made either as the integral part of shell 2 or as attached part to shell 2. Both interdigital ridge members 18 form three groove members 19 to the left and right of both interdigital ridge members 18 on digital front part 5 of top shell 2. Ridge members 18 are made from materials which cushion the digits and are not irritating to the skin of the operator such as but not limited to hypoallergenic cushioned soft but firm rubber material. Ridge members 18 are grasped and held by said 2nd, 3rd and 4th digits to move, hold, lift, manipulate and stabilize mouse 1 during the application on the mouse cushion pad or desktop by the hand of the mouse operator. The left ridge member is held between medial aspect of the 2nd digit and the lateral aspect of the 3rd digit. The right ridge member is held between medial aspect of the 3rd digit and the lateral aspect of the 4th digit. Another way of understanding the function of both ridge members 18 is that both ridge members 18 of mouse 1 serve the function with 2nd, 3rd and 4th digits just as the left and right sides of any computer mouse of prior art serve the function with the thumb and little finger.

In addition, during the manufacturing process, the top surface of shell 2 are endowed with maximal friction to allow the optimal movement of mouse 1 on the mouse cushion pad or desktop surface with minimal effort and without extraneous recruitment of muscles of the hand.

Figure 2:
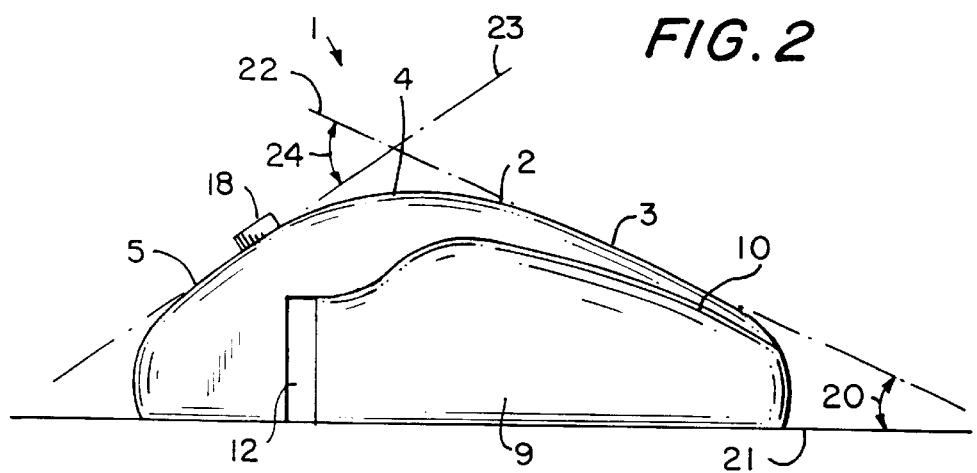
FIG. 2 is a schematic left side view of the present invention.

FIG. 2 shows the left side view of mouse 1. In this view, the ergonomic design to the top shell or case 2 of mouse 1 is to keep the carpal tunnel to be at the largest dimension base on available scientific data is the bulbous, inclined posterior palmar part 3 of top shell 2 of mouse 1 on which the palm of the hand of the operator so contoured to fit and to rest on the surface of said part at the inclination of said part results in the palm of the operator to be at approximately 30 degree 20 to the horizontal surface 21 of the mouse cushion pad or the horizontal surface of the desktop. To eliminate the function of 2nd, 3rd and 4th digits, also known as the forefinger, middle finger and ring finger, respectively by maximally shortening the intrinsic and long flexor muscles of the 2nd, 3rd and 4th digits of the hand is the metacarpal part 4 being the apex of the intersection of the plane 23 of posterior palmar part 3 and plane 23 of the digital front part 5 of top shell 2 whereby said planes intersect at about 90 degree angle 24 at metacarpal part 4. So rest on metacarpal part 4 and part 5, the 2nd, 3rd and 4th digits are essentially immobilized and the intrinsic and long flexor muscles of the 2nd, 3rd and 4th digits are maximally shortened to render them nonfunctional and with least isometric movement.

Figure 3:
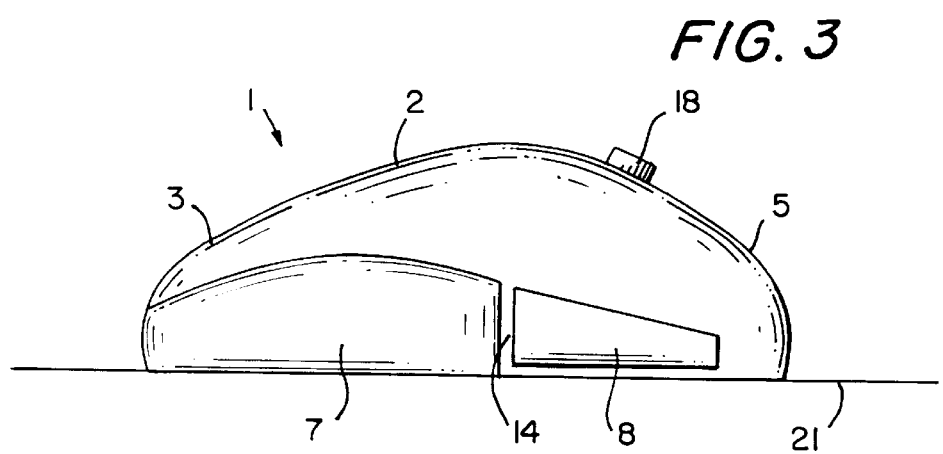
FIG. 3 is a schematic right side view of the present invention.

FIG. 3 shows the right side view of mouse 1.

Mouse 1 and said various components of mouse 1 are manufactured from the same standard materials such as plastic, various spring-loaded, mechanical clicking mechanism and wiring which are used to make mouse of prior art.

Having described the preferred embodiments of the present invention, it is to be understood that the present invention is not limited to said precise embodiments. Various changes, adaptations and modifications may be effected therein by individual skills in the art and science without departing from the scope or spirit of the present invention.

Although the preferred embodiments of the present invention was described for a right-handed operator, it is obvious that the present invention will be designed and adapted for and used by the left-handed operator without departing from the scope and spirit of the present invention.

Having described the preferred embodiments of the present invention for the desktop, it will be appreciated by those skilled in the art that the preferred embodiments may be adapted for other instruments such as, but not limited to, laptop computer configuration, television, cashier machine, calculator, display monitor without departing from the scope and spirit of the present invention.

What is claimed is:

1. A hand-controlled computer mouse that prevents pain, dysfunction syndrome, inflammations and repetitive strain injuries of the upper extremity comprising:

means for positioning the palm of an operator at 30 degrees to the horizontal surface of a desktop;

means for maximally shortening the intrinsic and long flexor muscles of the $2^{nd}$, $3^{rd}$ and $4^{th}$ digits of the hand;

means for moving, holding, lifting, manipulating, and stabilizing said mouse;

means for immobilizing the flexor muscles of the thumb;

means for immobilizing the flexor muscles of the fifth digit of the hand;

means for a thenar-muscle-powered left mouse click button on said mouse as a first means for signal communication between the operator and a computer;

means for a hypothenar-muscle-powered right mouse click button on said mouse as a first means for signal communication between the operator and the computer;

means for detecting a myoelectrical potential change and current generated by muscular activity of the thenar eminence as a second meanis for signal communication between the operator and the computer; and means for detecting a myoclectrical potential chance and current generated by muscular activity of hypothenar eminence as a second means of signal communication between the operator and the computer.

2. The hand-controlled computer mouse according to claim 1 wherein said means for positioning the palm of an operator at 30 degrees to the horizontal surface of a desktop is a bulbous, inclined posterior palmar part of a contoured top shell of said mouse on which said palm fits and rests.

3. The hand-controlled computer mouse according to claim 1 wherein said means for maximally shorteninig the intrinsic and long flexor muscles of the $2^{nd}$, $3^{rd}$ and $4^{th}$ digits of the hand are a metacarpal part and an inclined front part of a top shell of said mouse on which said $2^{nd}3^{rd}$ and $4^{th}$ digits are immobilized.

4. The hand-controlled computer mouse according to claim 1 wherein said means for moving, holding, lifting, manipulating, and stabilizing said mouse are two vertical, longitudinal, interdigital ridge members of an inclined front part of a top shell of said mouse which are grasped and held by said $2^{nd}$, $3^{rd}$ and $4^{th}$ digits.

5. The hand-controlled computer mouse according to claim 1 wherein said means for immobilizing the flexor muscles of the thumb is a distal phalangeal pad on the left click button of said mouse.

6. The hand-controlled computer mouse according to claim 1 wherein said means for immobilizing the flexor muscles of the fifth digit of the hand is a fifth-digit right click button of said mouse.

7. The hand-controlled computer mouse according to claim 1 wherein said means for a thenar-muscle-powered left mouse click button on said mouse as a first means for signal communication between the operator and the computer is a spring-loaded, movable thenar-muscle-powered left click button to the left of a top shell of said mouse.

8. The hand-controlled computer mouse according to claim 1 wherein said means for a hypothenar-muscle-powered right mouse click button on said mouse as a first means for signal communication between the operator and the computer is a spring loaded, movable hypothenar-muscle-powered right click button to the right of a top shell of said mouse.

9. The hand-controlled computer mouse according to claim 1 wherein said means for detecting a myoelectrical potential change and current generated by muscular activity of the thenar eminence as a second means for signal communication between the operator and the computer comprises a broad surface, contoured myoelectrical electrode pad located on the left click button on which the the near eminence fits and rests and wherein said pad is adapted to detect and transmit said myoelectrical potential change and current to the computer.

10. The hand-controlled computer mouse according to claim 1 wherein said means for detecting a miyoelectrical potential change and current generated by muscular activity of hypothenar eminence as a second means for signal communication between the operator and the computer comprises a broad surface, contoured myoelectrical electrode pad located on the right side of the posterior palmar part on which the hypothenar eminence fits and rests and wherein said pad is adapted to detect and transmit myoelectrical potential change and current to the computer.

* * * * *